United States Patent
Wu et al.

(10) Patent No.: US 11,496,050 B2
(45) Date of Patent: Nov. 8, 2022

(54) GATE DRIVER FOR DC-DC CONVERTERS

(71) Applicant: TEXAS INSTRUMENTS INCORPORATED, Dallas, TX (US)

(72) Inventors: Xufeng Wu, Shanghai (CN); Wei Zhao, Shanghai (CN); Yueming Sun, Shanghai (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 49 days.

(21) Appl. No.: 17/204,360

(22) Filed: Mar. 17, 2021

(65) Prior Publication Data

US 2021/0296986 A1 Sep. 23, 2021

Related U.S. Application Data

(60) Provisional application No. 62/990,806, filed on Mar. 17, 2020.

(51) Int. Cl.
| | |
|---|---|
| *H02M 3/158* | (2006.01) |
| *H02M 3/157* | (2006.01) |
| *H02M 1/32* | (2007.01) |
| *H02M 1/00* | (2006.01) |
| *H02M 1/38* | (2007.01) |

(52) U.S. Cl.
CPC ............ *H02M 3/157* (2013.01); *H02M 1/32* (2013.01); *H02M 3/158* (2013.01); *H02M 1/0009* (2021.05); *H02M 1/38* (2013.01)

(58) Field of Classification Search
CPC .... H02M 1/0006; H02M 1/0009; H02M 1/08; H02M 1/32; H02M 1/38; H02M 1/44; H02M 3/157; H02M 3/158
See application file for complete search history.

(56) References Cited

U.S. PATENT DOCUMENTS

| | | | | |
|---|---|---|---|---|
| 5,461,302 | A * | 10/1995 | Garcia ................. | H02M 3/158 323/222 |
| 6,559,689 | B1 * | 5/2003 | Clark ................... | H03K 17/063 327/91 |
| 9,137,862 | B2 | 9/2015 | Kulkarni et al. | |
| 9,866,099 | B1 | 1/2018 | Assaad et al. | |
| 10,469,068 | B1 | 11/2019 | Liu et al. | |
| 2013/0187684 | A1 * | 7/2013 | Gangopadhya ...... | H03K 17/063 327/109 |

(Continued)

*Primary Examiner* — Matthew V Nguyen
(74) *Attorney, Agent, or Firm* — Michael A. Davis, Jr.; Charles A. Brill; Frank D. Cimino

(57) ABSTRACT

A device includes a first FET coupled between first and drive terminals, and is configured to turn on/off responsive to a PWM signal having a first/second state, respectively. A second FET is coupled between the first and drive terminals and is configured to turn on responsive to the PWM signal having the first state, and turn off responsive to expiration of a particular delay after the second FET turns on. A third FET is coupled between drive and second terminals, and is configured to turn on/off responsive to the PWM signal having the second/first state, respectively. A fourth FET is coupled between the drive and second terminals, and is configured to turn on responsive to the PWM signal having the second state if a switching terminal has a first voltage, and turn off responsive to the PWM signal having the first state or the switching terminal having a second voltage.

20 Claims, 7 Drawing Sheets

(56) References Cited

U.S. PATENT DOCUMENTS

2017/0353105 A1* 12/2017 Solie ................. H02M 1/36
2018/0331682 A1* 11/2018 Duduman ............ H02M 1/38
2021/0091668 A1* 3/2021 Buhari ............ H03K 17/08122

* cited by examiner

GATE DRIVER FOR DC-DC CONVERTERS

CROSS-REFERENCE TO RELATED APPLICATIONS

This application claims priority to U.S. Provisional Patent Application No. 62/990,806, filed Mar. 17, 2020, which is hereby incorporated herein by reference in its entirety.

BACKGROUND

A switched mode power supply (SMPS) transfers power from an input power source to a load by switching one or more power transistors or other switching elements coupled through a switching terminal to an energy storage element (such as an inductor, an inductance of a transformer, and/or a capacitor), which is capable of coupling to the load. The power transistors can be included in a power converter that includes, or is capable of coupling to, the energy storage element. An SMPS can include an SMPS controller to provide one or more gate drive signals to the power transistor(s).

The input voltage to the converter can be greater than, less than or equal to the output voltage. If the input voltage is greater than the output voltage, the converter may be referred to as a "step-down" converter/regulator or a "buck converter." If the input voltage is less than the output voltage, the converter/regulator may be referred to as a "step-up" converter/regulator or a "boost converter."

SUMMARY

In an example of this description, a device includes a first field-effect transistor (FET) coupled between first and drive terminals, and is configured to turn on responsive to a PWM signal having a first state, and turn off responsive to the PWM signal having a second state. A second FET is coupled between the first and drive terminals and is configured to turn on responsive to the PWM signal having the first state, and turn off responsive to expiration of a particular delay after the second FET turns on. A third FET is coupled between drive and second terminals, and is configured to turn on responsive to the PWM signal having the second state, and turn off responsive to the PWM signal having the first state. A fourth FET is coupled between the drive and second terminals, and is configured to turn on responsive to the PWM signal having the second state if a switching terminal has a first voltage, and turn off responsive to the PWM signal having the first state or if the switching terminal has a second voltage.

In another example of this description, a device includes a first field-effect transistor (FET) having a first FET gate, a first FET source, and a first FET drain. The first FET source is coupled to a first terminal and the first FET drain is coupled to a drive terminal. The device also includes a second FET in parallel with the first FET. The device also includes a third FET having a third FET gate, a third FET source, and a third FET drain. The third FET source is coupled to a second terminal and the third FET drain is coupled to the drive terminal. The device also includes a fourth FET in parallel with the third FET. The device also includes a first inverter having a first inverter output and a first inverter input. The first inverter input is coupled to the third FET gate. The device also includes a second inverter having a second inverter output and a second inverter input. The second inverter input is coupled to the first FET gate. The device also includes a first NAND gate having a first NAND gate output and first NAND gate first and second inputs. The first NAND gate output is coupled to the first FET gate, the first NAND gate first input is coupled to the first inverter output, and the first NAND gate second input is configured to receive a pulse-width modulation (PWM) signal. The device also includes a second NAND gate having a second NAND gate output and second NAND gate first, second, and third inputs. The second NAND gate output is coupled to a second FET gate, the second NAND gate first input is coupled to the first NAND gate first input, the second NAND gate second input is coupled to the first NAND gate second input, and the second NAND gate third input is configured to receive a rising current transition signal. The device also includes a first NOR gate having a first NOR gate output and first NOR gate first and second inputs. The first NOR gate output is coupled to the third FET gate, the first NOR gate first input is coupled to the second inverter output, and the first NOR gate second input is coupled to the first NAND gate second input. The device also includes a second NOR gate having a second NOR gate output and second NOR gate first, second, and third inputs. The second NOR gate output is coupled to a fourth FET gate, the second NOR gate first input is coupled to the first NOR gate first input, the second NOR gate second input is coupled to the first NAND gate second input, and the second NOR gate third input is configured to receive a falling current transition signal.

In yet another example of this description, a system includes a voltage converter including a power field-effect transistor (FET), and a gate driver coupled to the voltage converter. The gate driver includes a first FET coupled between a drive terminal of the power FET and a first terminal, the first FET being configured to turn on responsive to a pulse-width modulation (PWM) signal having a first state, and turn off responsive to the PWM signal having a second state. The gate driver includes a second FET coupled between the drive terminal and the first terminal, the second FET being configured to turn on responsive to the PWM signal having the first state, and turn off responsive to expiration of a particular delay after the second FET turns on. The gate driver includes a third FET coupled between the drive terminal and a second terminal, the third FET being configured to turn on responsive to the PWM signal having the second state, and turn off responsive to the PWM signal having the first state. The gate driver includes a fourth FET coupled between the drive terminal and the second terminal, the fourth FET being configured to turn on responsive to the PWM signal having the second state if a switching terminal has a first voltage, and turn off responsive to the PWM signal having the first state or if the switching terminal has a second voltage.

DETAILED DESCRIPTION

One type of SMPS is a direct current (DC)-DC converter, which is useful in power electronics, industrial applications, automotive applications, and the like. DC-DC converters can include a high-side power field-effect transistor (FET) (or high-side device (HSD)) and a low-side power FET (or low-side device (LSD)) coupled through a switching terminal. In some cases, currents flowing through these transistors change rapidly. These rapidly changing currents also flow through parasitic inductances of traces, wires, or other interconnects coupled to the transistors, which results in voltage transients. These voltage transients excite resonant tanks formed by parasitic inductances and capacitances of the traces, wires or other interconnects, which in turn produces damped sinusoidal voltage waveforms superimposed on voltage levels. This phenomenon is referred to as "ringing." Ringing, when unmitigated, can create electromagnetic interference (EMI) and can damage components in a circuit that are not capable of withstanding these increased voltages. Components that are capable of withstanding these higher voltages might not be used because they are less efficient, more costly and/or use greater space.

In cases where the DC-DC converter is a boost converter, the switching terminal and the output terminal of the boost converter are more significant ringing terminals because ringing on these terminals can damage components that are connected to the switching terminal and/or to the output of the boost converter. In cases where the DC-DC converter is a buck converter, the switching terminal and the input terminal of the buck converter are more significant ringing terminals because ringing on these terminals can damage components that are connected to the switching terminal and/or to the input terminal of the buck converter. Irrespective of the particular converter topology, the peak-to-peak voltage of the ringing results from both parasitic inductances, as described above. Ringing also results from a rate of change of current (e.g., a di/dt parameter) through the low-side FET coupled to the switching terminal of a boost converter (or the high-side FET coupled to the switching terminal of a buck converter) responsive to the DC-DC converter switching from one of the power FETs being on to the other of the power FETs being on. Examples of this description are directed to controlling the di/dt parameter, which, in turn, reduces or limits the peak-to-peak voltage of the ringing and thus reduces the likelihood of damaging components that are connected to the DC-DC converter.

Figure 1:
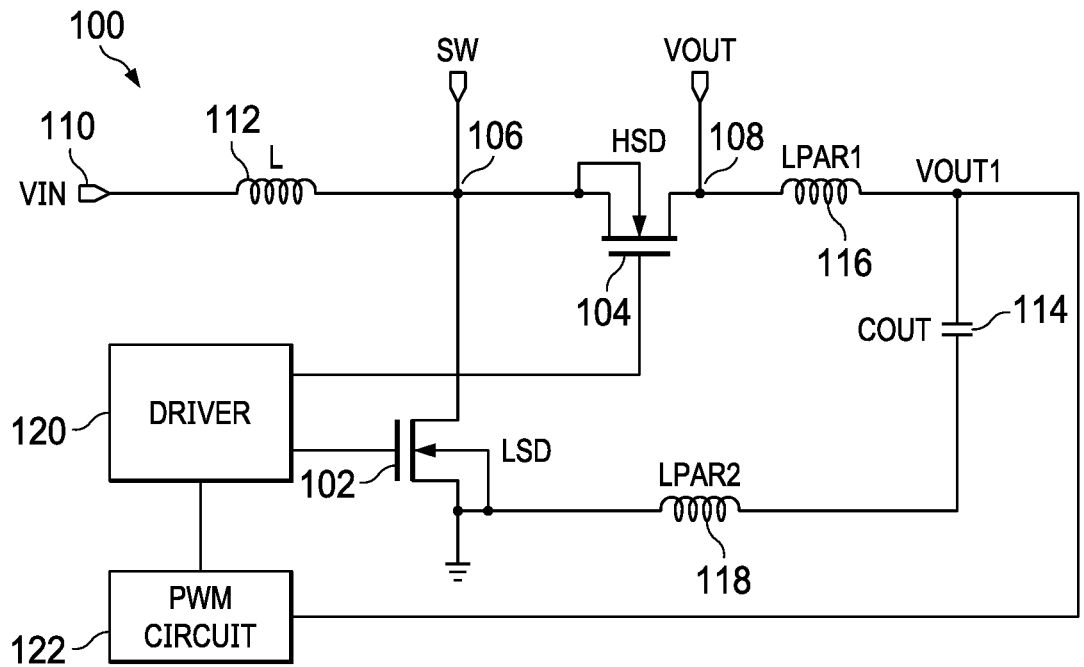
FIG. 1 is a schematic diagram of an SMPS including parasitic inductances in various examples.

FIG. 1 is a schematic diagram of an example SNIPS, such as a DC-DC converter 100. The DC-DC converter 100 includes a low-side FET 102 and a high-side FET 104. The low-side FET 102 has a gate, a source coupled to a ground terminal, and a drain coupled to a switching terminal 106 (the voltage at which is labeled SW). The high-side FET 104 has a source coupled to the switching terminal 106 and a drain coupled to an output terminal 108 (the voltage at which is labeled VOUT). An input terminal 110 (the voltage at which is labeled VIN) is also coupled to the switching terminal 106 through an input inductor 112 (the inductance of which is labeled L). An output capacitor 114 is coupled to the output terminal 108 and to the ground terminal. Parasitic inductances (e.g., introduced by traces, wires, and other interconnects used to couple the DC-DC converter 100 to an integrated circuit) are represented by a first parasitic inductor 116 that is between the output terminal 108 and to the output capacitor 114 and by a second parasitic inductor 118 that is between the ground terminal and to the output capacitor 114.

In some examples, the DC-DC converter 100 is controlled by a gate driver 120 and a pulse-width modulation (PWM) control circuit 122. In some examples, PWM is used to control the regulation of the output voltage (VOUT) relative to the input voltage (VIN). The PWM control circuit 122 is coupled to the gate driver 120, and the gate driver 120 is coupled to the gates of the low-side FET 102 and the high-side FET 104. For example, the PWM control circuit 122 provides control signals to the gate driver 120 to switch on and off the low-side FET 102 and the high-side FET 104. In some examples, the PWM control circuit 122 receives a feedback signal (e.g., the voltage across the output capacitor 114, labeled VOUT1 to indicate a possible difference relative to VOUT due to the first parasitic inductor 116) and controls the operation of the DC-DC converter 100 based on the feedback signal. For example, the PWM control circuit 122 increases or decreases a duty cycle of the DC-DC converter 100 based on the feedback signal. For example, responsive to the feedback signal indicating that VOUT is lower than a target, the feedback signal causes the PWM control circuit 122 to increase the duty cycle, which is then carried out by the gate driver 120 to vary the on/off times of the low-side FET 102 and the high-side FET 104. Responsive to the feedback signal indicating that VOUT is higher than a target, the feedback signal causes the PWM control circuit 122 to decrease the duty cycle, which is then carried out by the gate driver 120 to vary the on/off times of the low-side FET 102 and the high-side FET 104.

Figure 2:
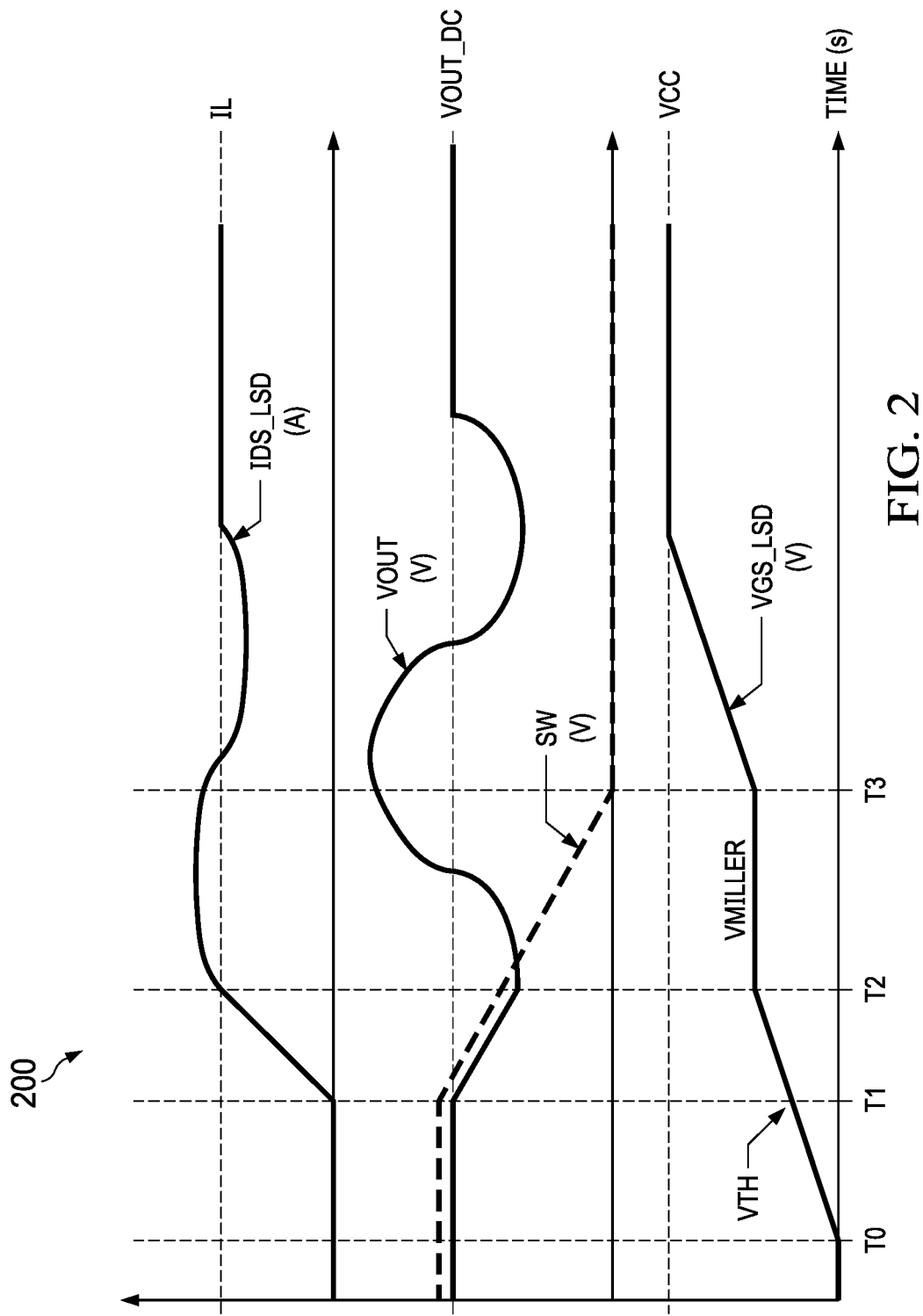
FIG. 2 is a graph of signal waveforms representing operation of the SMPS of FIG. 1.

FIG. 2 is a graph of signal waveforms 200 representing the operation of the DC-DC converter 100 of FIG. 1 responsive to the PWM control circuit 122 causing the gate driver 120 to turn the low-side FET 102 on. In the waveforms 200, IDS_LSD represents a drain-to-source current through the low-side FET 102, SW represents a voltage at the switching terminal 106, VOUT represents a voltage at the output terminal 108, and VGS_LSD represents a gate-to-source voltage of the low-side FET 102 (e.g., a gate voltage). Also, IL represents a current through the input inductor 112, VOUT_DC represents a target DC output voltage for the DC-DC converter 100, and VCC represents a supply voltage of the gate driver 120.

At time T0, the gate driver 120 begins to charge the gate of the low-side FET 102 (e.g., responsive to a PWM signal (LSD_ON) from the PWM control circuit 122), which causes VGS_LSD to increase from the voltage at the ground terminal.

At time T1, VGS_LSD is charged to a threshold voltage (VTH) of the low-side FET 102, which creates a conducting path between the source and drain terminals of the low-side FET 102. Responsive to VGS_LSD reaching VTH, IDS_LSD begins to increase. At this time, SW and VOUT begin to fall from VOUT_DC due to the parasitic inductors 116, 118.

At time T2, VGS_LSD is charged to a Miller voltage (VMILLER) of the low-side FET 102, and thus the low-side FET 102 enters the Miller plateau region. At this time, IDS_LSD also increases to IL. The time period between time T1 and time T2 is referred to as the rising current transition because IDS_LSD increases from zero to the inductor 112 current IL. Also, at this time, SW continues to fall due to the low-side FET 102 being turned on. Further, VOUT begins to rise (e.g., deviates from SW) and exhibit ringing behavior due to a resonant circuit formed by parasitic capacitance at the output terminal 108 and the parasitic inductors 116, 118. In some examples, IDS_LSD also exhibits some ringing behavior due to the high-side FET 104 behaving like a diode (with an associated capacitance) responsive to being turned off. Due to the voltage difference between SW and VOUT when VOUT is ringing, there is a relatively small charging and discharging current on the high-side FET 104, which flows through the low-side FET 102 because the inductor 112 current is a DC current.

At time T3, SW has decreased to the voltage at the ground terminal, and the gate driver 120 continues to charge VGS_LSD to the power supply of the gate driver 120, VCC.

Figure 3:
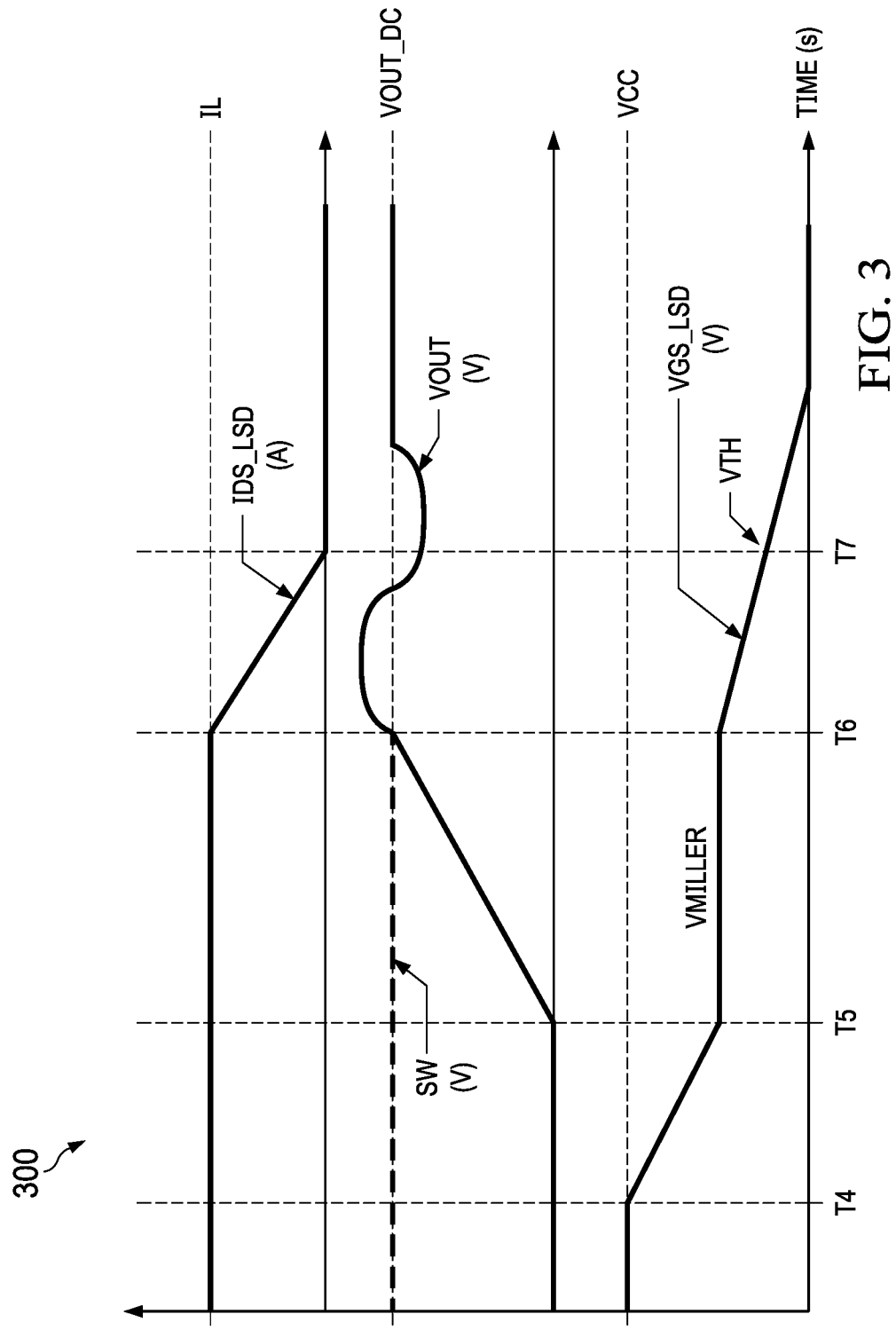
FIG. 3 is a graph of signal waveforms representing operation of the SMPS of FIG. 1.

FIG. 3 is a graph of signal waveforms 300 representing the operation of the DC-DC converter 100 of FIG. 1 responsive to the PWM control circuit 122 causing the gate driver 120 to turn the low-side FET 102 off. In the waveforms 300, signals are labeled in a like manner to those shown in FIG. 2 and described above.

At time T4, the gate driver 120 begins to discharge the gate of the low-side FET 102 (e.g., responsive to the LSD_ON signal from the PWM control circuit 122), which causes VGS_LSD to decrease from VCC.

At time T5, VGS_LSD is discharged to VMILLER of the low-side FET 102, and thus the low-side FET 102 enters the Miller plateau region. At the same time, SW begins to increase from the voltage at the ground terminal.

At time T6, SW reaches VOUT_DC, and IDS_LSD begins to decrease from IL as current through the inductor 112 begins to flow through the high-side FET 104. Also, at this time, SW and VOUT exhibit ringing behavior due to the resonant circuit described above, formed by the parasitic capacitance at the switching terminal 106 and the parasitic inductors 116, 118. In this case, SW and VOUT exhibit similar ringing behavior because the high-side FET 104 functions as a diode.

At time T7, VGS_LSD is discharged to VTH, which cuts off the conducting path between the source and drain terminals of the low-side FET 102. Accordingly, IDS_LSD also decreases to zero. The time period between time T6 and time T7 is referred to as the falling current transition because IDS_LSD decreases from the inductor 112 current IL to zero.

Examples of this description control the di/dt parameter to limit the ringing on the switching terminal 106 and the output terminal 108 (e.g., reduce the peak-to-peak voltage at the switching terminal 106 and the output terminal 108), which reduces the likelihood of damaging components coupled to the switching terminal 106 or the output terminal 108. As described below, the gate driver 120 includes control circuitry that is configured to identify the time periods during which the rising current transition and the falling current transition occur. Responsive to the control circuitry indicating that a rising or falling current transition is occurring, the gate driver 120 is configured to tune the gate drive strength for the low-side FET 102, such as by reducing the gate drive strength during the rising or falling current transition to limit ringing at the switching terminal 106 and the output terminal 108. Further, the gate driver 120 is configured to increase the gate drive strength outside of the rising or falling current transitions to reduce switching losses of the DC-DC converter 100.

Figure 4:
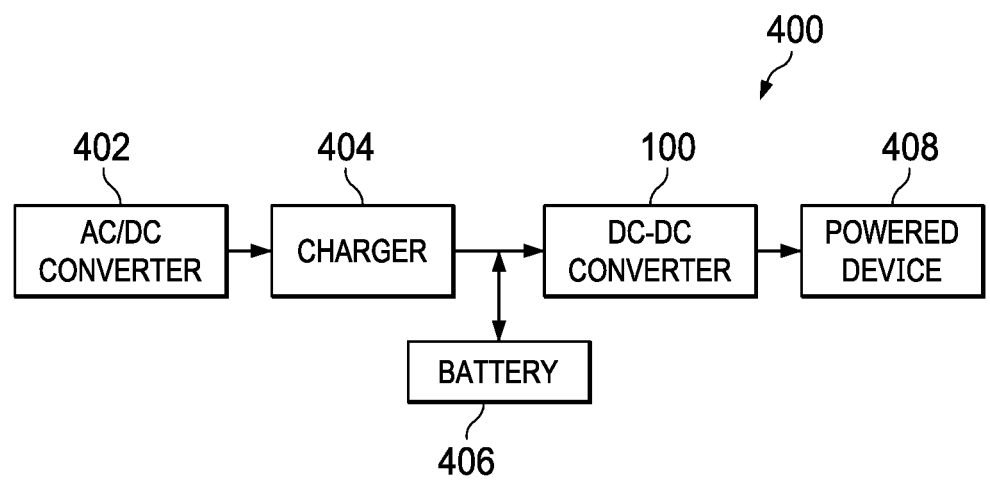
FIG. 4 is a block diagram of a system in various examples.

FIG. 4 is a block diagram of a system 400 including examples of this description. The system 400 includes the DC-DC converter 100 described above. Also, the system 400 includes an alternating current (AC)-DC converter 402, a battery charger 404 coupled to the AC-DC converter 402, and a battery 406 coupled to the battery charger 404. An input of the DC-DC converter 100 (e.g., VIN) is coupled to the charger 404 as well as to the battery 406. The system 400 also includes a powered device 408 that is coupled to an output of the DC-DC converter 100 (e.g., VOUT).

The AC-DC converter 402 is configured to provide a DC voltage signal as an output responsive to receiving an AC voltage signal (e.g., from AC mains) as an input. The charger 404 is configured to receive the DC voltage signal provided by the AC-DC converter 402 and to charge the battery 406. The battery 406 and/or the charger 404 are configured to provide a DC voltage signal as an input to the DC-DC converter 100. For example, a battery 406 voltage is provided to the DC-DC converter 100 as VIN. The DC-DC converter 100 provides its output voltage signal (VOUT) to the powered device 408. The powered device 408 can include power electronics, electronics used in industrial applications, electronics used in automotive applications, and the like. For example, the powered device 408 is a power amplifier for a portable speaker, a source driver of a computer display, or a Universal Serial Bus (USB) Type-C Power Delivery (PD) module.

Figure 5:
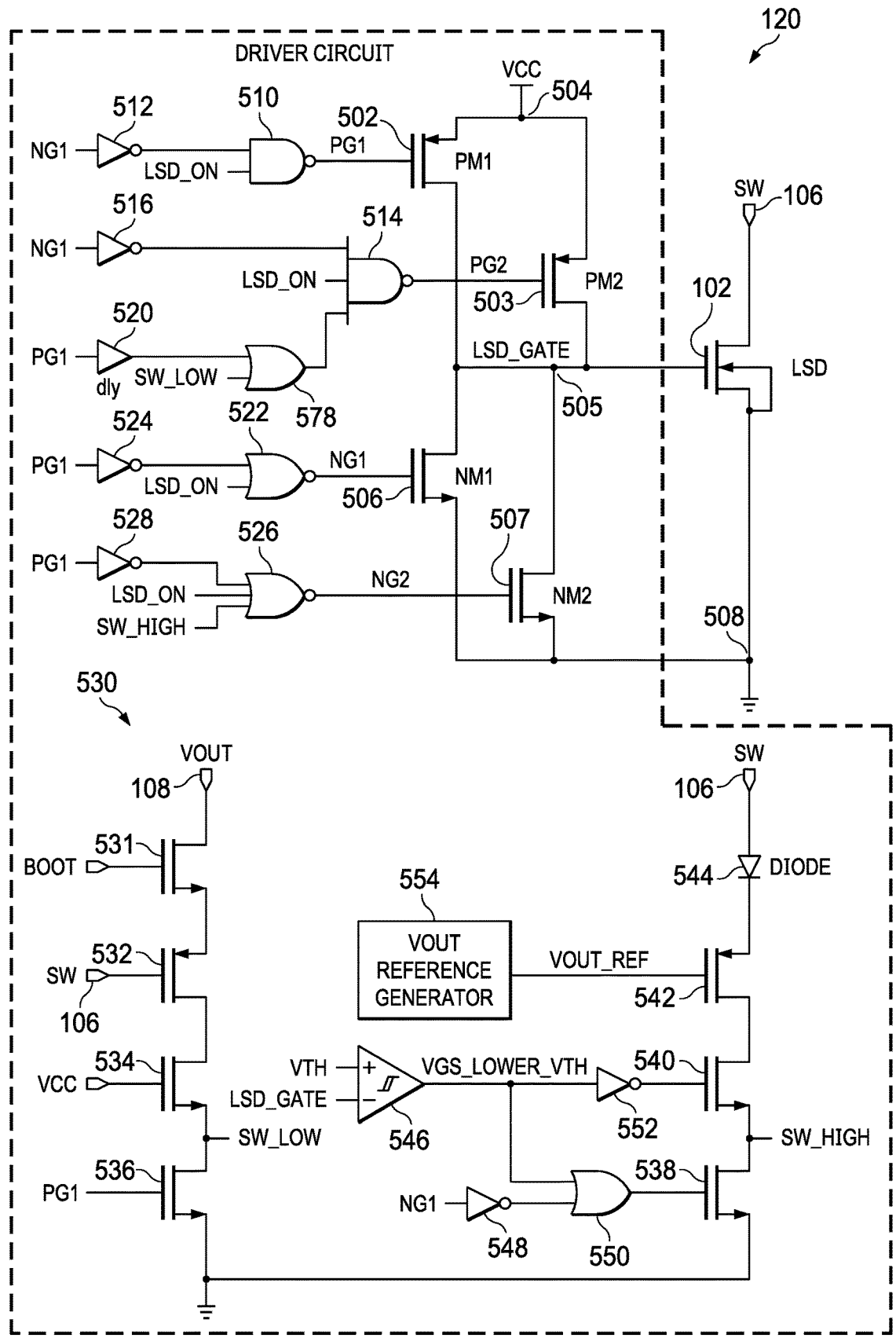
FIG. 5 is a schematic diagram of a driver circuit in various examples.

FIG. 5 is a schematic diagram of the gate driver 120 in examples of this description. In the example of FIG. 5, the gate driver 120 is configured to control the low-side FET 102 of a boost converter. The gate driver 120 includes a first transistor 502 and a second transistor 503. In an example, the first and second transistors 502, 503 are p-type FETs. In examples, the first and second transistors 502, 503 are p-type metal-oxide-semiconductor FETs (MOSFETs). Each of the first transistor 502 and the second transistor 503 has a source coupled to a voltage supply terminal 504 (the voltage at which is labeled VCC) and a drain coupled to a gate or drive terminal 505. The drive terminal 505 is adapted to be coupled to the gate of the low-side FET 102 as shown in FIG. 5. The gate driver 120 also includes a third transistor 506 and a fourth transistor 507. In an example, the third and fourth transistors 506, 507 are n-type FETs (e.g., n-type MOSFETs). Each of the third transistor 506 and the fourth transistor 507 has a source coupled to a ground terminal 508 and a drain coupled to the drive terminal 505.

The gate driver 120 is configured to control gates of the transistors 502, 503, 506, 507 to drive the gate of the low-side FET 102 by coupling the gate of the low-side FET 102 to either the voltage supply terminal 504 or to the ground terminal 508. As described above, the PWM control circuit 122 is coupled to the gate driver 120 and provides control signals to the gate driver 120 to switch on and off the low-side FET 102 and the high-side FET 104. For example, the PWM control circuit 122 provides a LSD_ON signal to the gate driver 120. In the examples of this description, the PWM control circuit 122 drives the LSD_ON signal to a logic high (e.g., a first state) to cause the gate driver 120 to turn on the low-side FET 102 (e.g., to couple the gate of the low-side FET 102 to the voltage supply terminal 504) and to a logic low (e.g., a second state) to cause the gate driver 120 to turn off the low-side FET 102 (e.g., to couple the gate of the low-side FET 102 to the ground terminal 508).

The gate of the first transistor 502 is controlled by an output of a first NAND gate 510. The first NAND gate 510 has a first input that receives the LSD_ON signal from the PWM control circuit 122. A first inverter 512 receives a gate signal of the third transistor 506 (NG1) as input and provides an inverted gate signal as output. The first NAND gate 510 has a second input that is coupled to the output of the first inverter 512.

A gate of the second transistor 503 is controlled by an output of a second NAND gate 514. The second NAND gate 514 has a first input that also receives the LSD_ON signal from the PWM control circuit 122. A second inverter 516 also receives NG1 as input and provides an inverted gate signal as output. The second NAND gate 514 has a second input that is coupled to the output of the second inverter 516. An OR gate 518 has a first input that receives a rising current transition end signal (SW_LOW), which is described further below, that indicates the end of a rising current transition. The OR gate 518 has a second input that is coupled to the output of a delay buffer 520 that receives a gate signal of the first transistor 502 (PG1) as input. The generation and function of the SW_LOW signal and the delayed PG1 signal produced by the delay buffer 520 are described further below. The second NAND gate 514 has a third input that is coupled to the output of the OR gate 518, which is also referred to as a rising current transition signal.

A gate of the third transistor 506 is controlled by an output of a first NOR gate 522. The first NOR gate 522 has a first input that also receives the LSD_ON signal from the PWM control circuit 122. A third inverter 524 receives PG1 as input and provides an inverted gate signal as output. The first NOR gate 522 has a second input that is coupled to the output of the third inverter 524.

A gate of the fourth transistor 507 is controlled by an output of a second NOR gate 526. The second NOR gate 526 has a first input that also receives the LSD_ON signal from the PWM control circuit 122. A fourth inverter 528 receives PG1 as input and provides an inverted gate signal as output. The second NOR gate 526 has a second input that is coupled to the output of the fourth inverter 528. The second NOR gate 526 also has a third input that receives a falling current transition signal (SW_HIGH) that indicates the beginning and the end of a falling current transition. The generation and function of the SW HIGH signal are described further below.

The first transistor 502 and the third transistor 506 are effectively controlled by the LSD_ON signal provided by the PWM control circuit 122. For example, responsive to LSD_ON being logic high, the output of the first NOR gate 522 (NG1) is logic low, and thus the third transistor 506 is off. The output of the first inverter 512 is logic high (e.g., inverted NG1) and, accordingly, the output of the first NAND gate 510 is logic low. Thus, the first transistor 502 is on, which drives the gate of the low-side FET 102 to VCC.

Responsive to LSD_ON being logic low, the output of the first NAND gate 510 (PG1) is logic high, and thus the first transistor 502 is off. The output of the third inverter 524 is logic low (e.g., inverted PG1) and, accordingly, the output of the first NOR gate 522 is logic high. Thus, the third transistor 506 is on, which pulls the gate of the low-side FET 102 down to the ground terminal 508.

The second transistor 503 is used to control the di/dt parameter during the rising current transition of the low-side FET 102. The fourth transistor 507 is used to control the di/dt parameter during the falling current transition of the low-side FET 102. For example, the second transistor 503 is turned off during the rising current transition, and the fourth transistor 507 is turned off during the falling current transition, which reduces the drive strength provided to the gate of the low-side FET 102, and thus the rate of change of current through the low-side FET 102 and the amplitude of ringing at the switching terminal 106 and the output terminal 108. Further, responsive to LSD_ON being logic high (e.g., to turn on the low-side FET 102) and the low-side FET 102 being outside of the rising current transition, the second transistor 503 is turned on to increase the drive strength of the gate of the low-side FET 102 to reduce switching losses of the DC-DC converter 100. Similarly, responsive to LSD_ON being logic low (e.g., to turn off the low-side FET 102) and the low-side FET 102 being outside of the falling current transition, the fourth transistor 507 is turned on to increase the drive strength of the gate of the low-side FET 102 to reduce switching losses of the DC-DC converter 100.

As described further below with respect to FIG. 6, the beginning of the rising current transition is indicated by the output of the delay buffer 520. Further, the end of the rising current transition is indicated by the SW_LOW signal. The beginning and the end of the falling current transition are indicated by the SW_HIGH signal. The gate driver 120 includes control circuitry 530 that is configured to provide the SW_LOW and SW_HIGH signals used to control the second transistor 503 and the fourth transistor 507, respectively.

To provide the SW_LOW signal, the control circuitry 530 includes a fifth transistor 531, a sixth transistor 532, a seventh transistor 534, and an eighth transistor 536. In an example, the fifth, seventh, and eighth transistors 531, 534, 536 are n-type FETs (e.g., n-type MOSFETs) and the sixth transistor 532 is a p-type FET (e.g., p-type MOSFET). The fifth transistor 531 has a drain that is coupled to the output terminal 108 and a source that is coupled to a source of the sixth transistor 532. The sixth transistor 532 also has a drain that is coupled to a drain of the seventh transistor 534. The seventh transistor 534 also has a source that is coupled to a drain of the eighth transistor 536. A source of the eighth transistor 536 is coupled to the ground terminal 508. The SW_LOW signal is provided by the terminal formed by the source of the seventh transistor 534 and the drain of the eighth transistor 536.

A boot voltage signal (BOOT) is provided to a gate of the fifth transistor 531 (e.g., by a boot supply terminal of a voltage source, not shown for simplicity). In an example, BOOT is a supply voltage (VCC) greater than SW. The SW voltage signal (e.g., from the switched terminal 106) is provided to a gate of the sixth transistor 532. The VCC voltage signal (e.g., from the voltage supply terminal 504) is provided to a gate of the seventh transistor 534. The PG1 voltage signal (e.g., from the gate of the first transistor 502) is provided to a gate of the eighth transistor 536.

The fifth transistor 531 is conducting because its gate is coupled to a boot supply terminal that provides the BOOT supply voltage. Similarly, the seventh transistor 534 is conducting because its gate is coupled to the VCC supply voltage. In this example, the fifth transistor 531 thus clamps the gate-to-source voltage of the sixth transistor 532, and the seventh transistor 534 thus clamps the drain-to-source voltage of the eighth transistor 536. Clamping the gate-to-source voltage of the sixth transistor 532 and the drain-to-source voltage of the eighth transistor 536 addresses voltage limitations on the sixth transistor 532 and eighth transistor 536 that exist in an actual circuit implementation.

Responsive to the gate of the first transistor 502 being logic high (e.g., LSD_ON is logic low), the eighth transistor 536 is on and thus SW_LOW is logic low (e.g., pulled down to the ground terminal 508). However, responsive to the gate of the first transistor 502 being logic low (e.g., LSD_ON is logic high), the eighth transistor 536 is off. As described above, responsive to LSD_ON being logic high, at least the first transistor 502 is on and the gate of the low-side FET 102 is charged to VCC, which pulls the switched terminal 106 (SW) down to the ground terminal 508. In some examples, SW begins to fall below VOUT responsive to the rising current transition ending, because the high-side FET 104 is off and the resistance of the low-side FET 102 is decreased as VGS_LSD increases. The sixth transistor 532 turns on responsive to SW being less than VOUT by at least a threshold voltage of the sixth transistor 532, which pulls SW_LOW logic high (e.g., to VCC). Thus, the control circuitry 530 detects a voltage condition (e.g., SW being less than VOUT by the sixth transistor 532 threshold voltage) that approximates the end of the rising current transition.

To provide the SW_HIGH signal, the control circuitry 530 includes a ninth transistor 538, a tenth transistor 540, and an eleventh transistor 542. In an example, the ninth and tenth transistors 538, 540 are n-type FETs (e.g., n-type MOSFETs), and the eleventh transistor 542 is a p-type FET (e.g., a p-type MOSFET). The ninth transistor 538 has a source that is coupled to the ground terminal 508 and a drain that is coupled to a source of the tenth transistor 540. A drain of the tenth transistor 540 is coupled to a drain of the eleventh transistor 542. A source of the eleventh transistor 542 is coupled to a cathode of diode 544. The SW_HIGH signal is provided by the terminal formed by the drain of the ninth transistor 538 and the source of the tenth transistor 540.

The control circuitry 530 also includes a comparator 546 that has an inverting input that is coupled to the gate of the low-side FET 102 and a non-inverting input that is adapted to be coupled to a reference voltage source that provides a voltage VTH. The voltage VTH is approximately equal to a threshold voltage of the low-side FET 102, and thus an output of the comparator 546 is logic high responsive to the low-side FET 102 turning off, which is also the end of the falling current transition. A fifth inverter 548 receives NG1 as input and provides an inverted gate signal as output. A second OR gate 550 has a first input coupled to the output of the comparator 546 and a second input coupled to the output of the fifth inverter 548. An output of the second OR gate 550 is coupled to a gate of the ninth transistor 538. A sixth inverter 552 has an input coupled to the output of the comparator 546 and an output coupled to a gate of the tenth transistor 540. The control circuitry 530 also includes a reference voltage generator 554 that provides a voltage signal VOUT_REF based on the voltage VOUT. VOUT_REF is provided to a gate of the eleventh transistor 542. Further, an anode of the diode 544 is coupled to the switching terminal 106.

As described above, responsive to LSD_ON being logic low, VGS_LSD decreases, and the switching terminal 106 (SW) begins to increase from the voltage at the ground terminal 508 responsive to VGS_LSD reaching VMILLER. In an example, VOUT_REF is less than VOUT. Accordingly, the eleventh transistor 542 turns on responsive to SW being greater than VOUT_REF by a threshold voltage of the eleventh transistor 542 plus a voltage across the diode 544 (VDIODE). At the same time, the low-side FET 102 has not yet turned off, so the output of the comparator 546 is logic low and thus the tenth transistor 540 is also on, which pulls SW_HIGH to logic high (e.g., to VCC). In some examples, SW being greater than VOUT_REF by the eleventh transistor 542 threshold voltage plus VDIODE occurs approximately when the falling current transition begins, because the high-side FET 104 begins to conduct responsive to SW reaching VOUT_DC, which occurs slightly after the condition that causes SW_HIGH to transition to logic high. Thus, the control circuitry 530 detects a voltage condition (e.g., SW being greater than VOUT_REF by the eleventh transistor 542 threshold voltage plus VDIODE) that approximates the beginning of the falling current transition.

As described above, the output of the comparator 546 is logic high responsive to the low-side FET 102 turning off, which is also the end of the falling current transition. The output of the comparator 546 being logic high causes the tenth transistor 540 to turn off and the ninth transistor 538 to turn on, which pulls SW_HIGH low (e.g., to the ground terminal 508). Thus, the control circuitry 530 also detects a voltage condition (e.g., the low-side FET 102 gate being below its threshold voltage) that approximates the end of the falling current transition.

Figure 6:
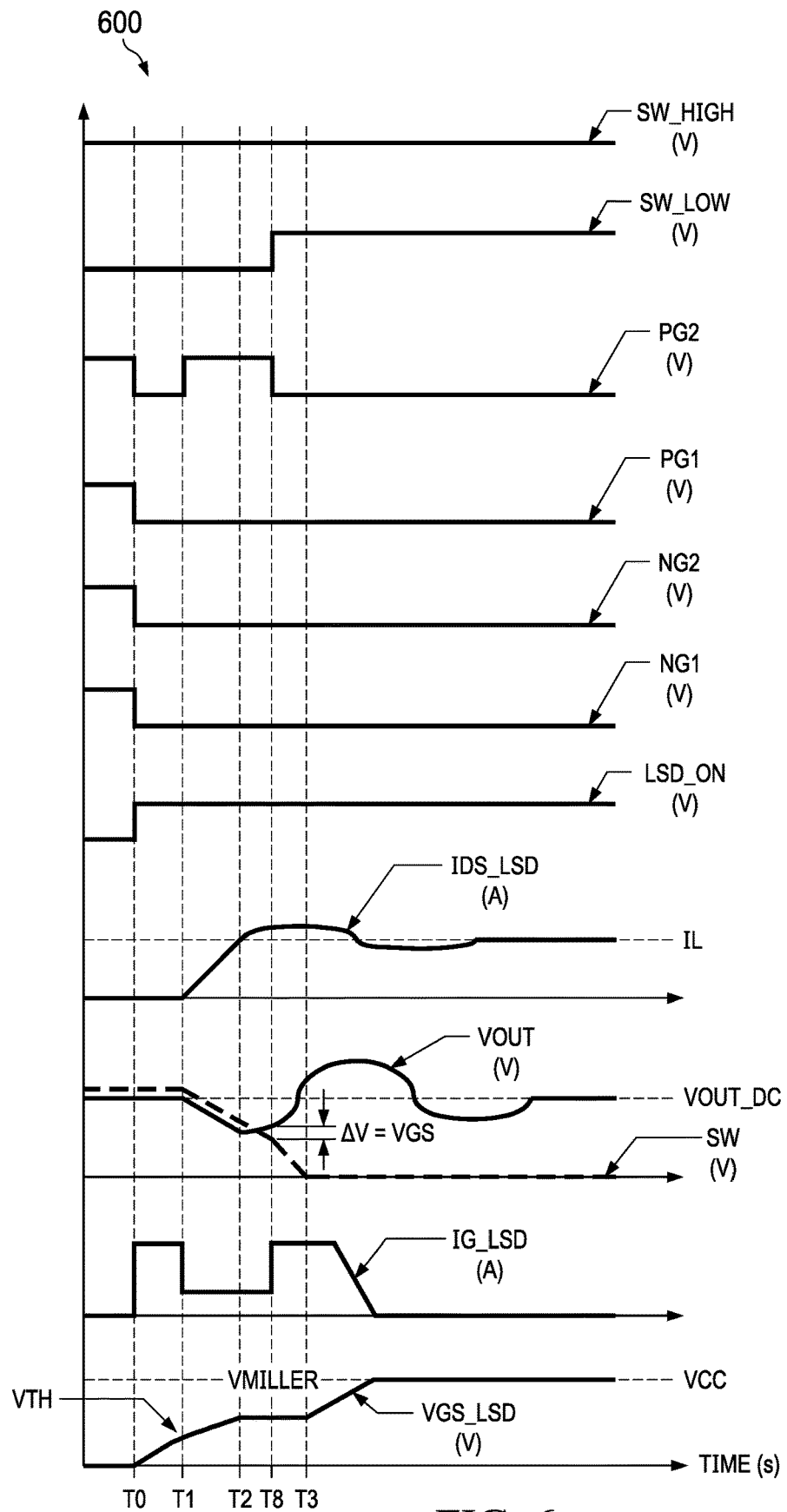
FIG. 6 is a graph of signal waveforms representing operation of the driver circuit of FIG. 5.

FIG. 6 is a graph of signal waveforms 600 (e.g., voltages or currents as a function of time) that represent the operation of the gate driver 120 of FIG. 5. For example, the waveforms 600 demonstrate the operation of the gate driver 120 when the PWM control circuit 122 causes the gate driver 120 to turn the low-side FET 102 on.

In the waveforms 600, SW_HIGH represents a voltage at the terminal formed by the drain of the ninth transistor 538 and the source of the tenth transistor 540, SW_LOW represents a voltage at the terminal formed by the source of the seventh transistor 534 and the drain of the eighth transistor 536, PG2 represents a voltage at the gate of the second transistor 503, PG1 represents a voltage at the gate of the first transistor 502, NG2 represents a voltage at the gate of the fourth transistor 507, NG1 represents a voltage at the gate of the third transistor 506, and LSD_ON represents a voltage of the signal from the PWM control circuit 122 that, when logic high, causes the gate driver 120 to begin to charge the gate of the low-side FET 102. IDS_LSD, SW, VOUT, and VGS_LSD are as described above with respect to FIGS. 2 and 3. IG_LSD represents a drive strength (e.g., gate current) applied to the gate of the low-side FET 102. Also, IL represents a current through the input inductor 112, VOUT_DC represents a target DC output voltage for the DC-DC converter 100, and VCC represents a supply voltage of the gate driver 120.

At time T0, LSD_ON transitions to logic high to cause the gate driver 120 to begin to charge the gate of the low-side FET 102 (e.g., with the first and second transistors 502, 503 being on), which causes VGS_LSD to increase from the voltage at the ground terminal. PG1 is effectively controlled by LSD_ON. For example, responsive to LSD_ON being logic high, the output of the first inverter 512 is logic high (e.g., inverted NG1) and, accordingly, the output of the first NAND gate 510 (PG1) is logic low. Also, PG2 is initially logic low at time T0 because the previously logic high PG1 is still provided to the OR gate 518 by the delay buffer 520, which causes the output of the second NAND gate 514 (PG2) to be logic low. NG1 and NG2 are also logic low at time T0 because LSD_ON being logic high causes the outputs of the first and second NOR gates 522, 526 to be logic low.

At time T1, VGS_LSD is charged to a threshold voltage (VTH) of the low-side FET 102, which creates a conducting path between the source and drain terminals of the low-side FET 102. Responsive to VGS_LSD reaching VTH, the rising current transition begins as IDS_LSD begins to increase. At this time, SW and VOUT begin to fall from VOUT_DC due to the parasitic inductors 116, 118. In this example, the delay buffer 520 is configured to delay its input (e.g., PG1) being provided as its output for approximately the amount of time that VGS_LSD takes to reach VTH responsive to being driven by the first and second transistors 502, 503. Thus, at time T1, PG1 having transitioned to logic low at time T0 is provided as the output of the delay buffer 520 (e.g., upon expiration of a particular delay implemented by the delay buffer 520), which causes the output of the OR gate 518 (e.g., the rising current transition signal) to transition to logic low, which causes the output of the second NAND gate 514 (PG2) to transition to logic high and turn off the second transistor 503. Accordingly, the gate drive strength for the low-side FET 102 is reduced at time T1 responsive to the rising current transition beginning, which is reflected by the drop in IG_LSD.

At time T2, VGS_LSD is charged to VMILLER of the low-side FET 102 and thus the low-side FET 102 enters the Miller plateau region. At this time, IDS_LSD also increases to IL. Although the rising current transition ends at time T2, in examples of this description, the end of the rising current transition is sensed based on circuit voltage conditions.

At time T8, a voltage condition that indicates the end of the rising current transition occurs, which causes SW_LOW to transition to logic high, which causes the output of the OR gate 518 (e.g., the rising current transition signal) to transition to logic high, which causes the output of the second NAND gate 514 (PG2) to transition back to logic low and again turn on the second transistor 503. As described above, SW_LOW transitions to logic high responsive to SW being less than VOUT by a threshold voltage of the sixth transistor 532. This voltage condition is represented by the delta in voltage between SW and VOUT at time T8. Accordingly, the gate drive strength for the low-side FET 102 is increased at time T8 responsive to the voltage condition indicating that the end of the rising current transition has occurred, which is reflected by the increase in IG_LSD.

At time T3, SW has fallen down to the voltage at the ground terminal, and the gate driver 120 continues to charge VGS_LSD to the power supply of the gate driver 120, VCC.

Thus, the di/dt parameter of the low-side FET 102 is controlled during the rising current transition, which reduces ringing on the output terminal 108 during a period in which the low-side FET 102 is turning on, as described above. Also, after the rising current transition ends (e.g., at time T8), the gate drive strength for the low-side FET 102 is increased to reduce switching losses of the DC-DC converter 100.

Figure 7:
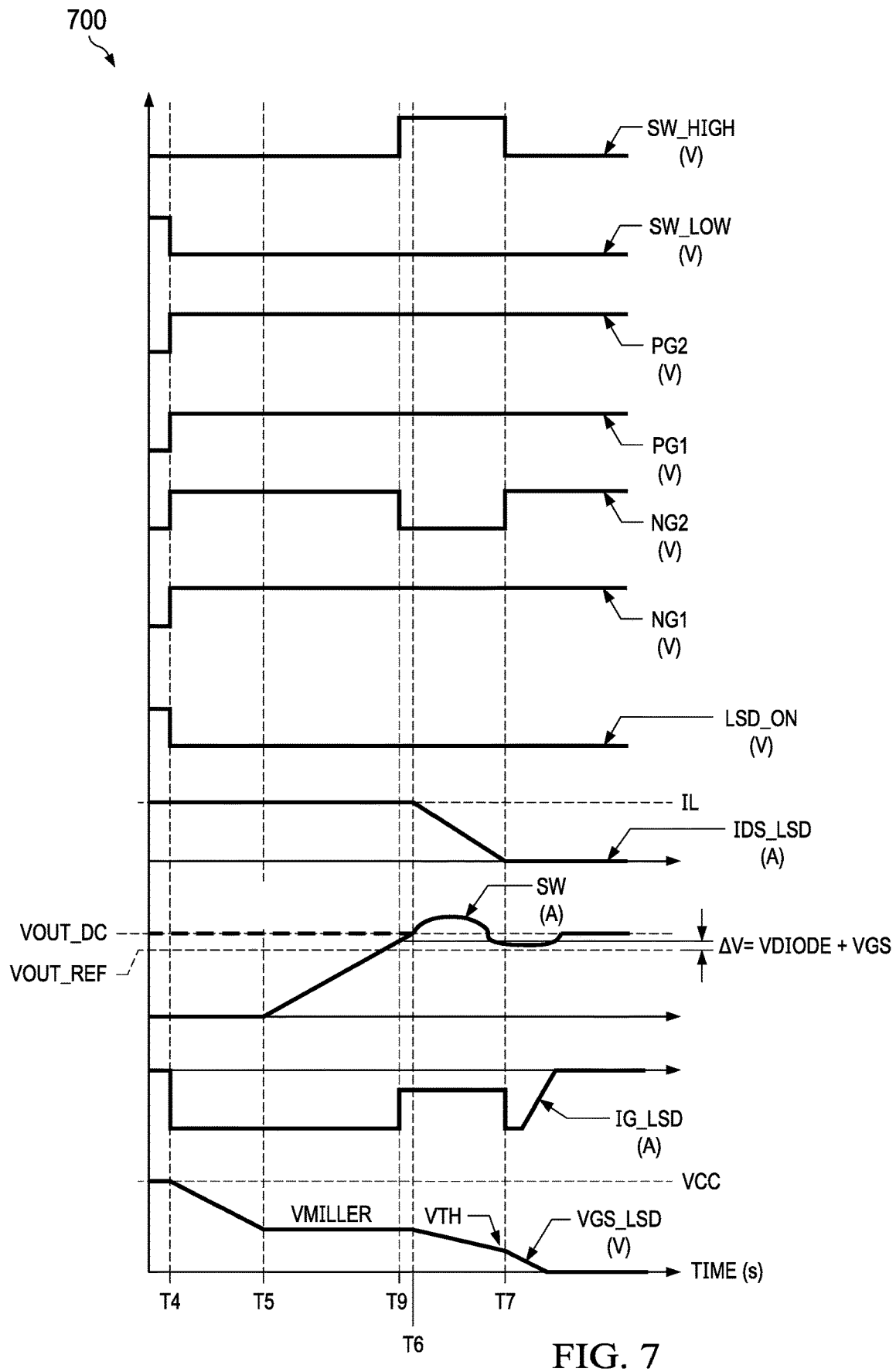
FIG. 7 is a graph of signal waveforms representing operation of the driver circuit of FIG. 5.

FIG. 7 is a graph of signal waveforms 700 (e.g., voltages or currents as a function of time) that represent the operation of the gate driver 120 of FIG. 5. For example, the waveforms 700 demonstrate the operation of the gate driver 120 responsive to the PWM control circuit 122 causing the gate driver 120 to turn the low-side FET 102 off. In the waveforms 700, signals are labeled in a like manner to those shown in FIG. 6 and described above. Also, VOUT_REF is a voltage signal based on the voltage VOUT and, in this example, is less than VOUT.

At time T4, LSD_ON transitions to logic low to cause the gate driver 120 to begin to discharge the gate of the low-side FET 102 (e.g., with the third and fourth transistors 506, 507 being on), which causes VGS_LSD to decrease from VCC. NG1 is effectively controlled by LSD_ON. For example, responsive to LSD_ON being logic low, the output of the third inverter 524 is logic low (e.g., inverted PG1) and, accordingly, the output of the first NOR gate 522 (NG1) is logic high. Also, NG2 is initially logic high at time T4 because the output of the fourth inverter 528 is logic low (e.g., inverted PG1) and, accordingly, the output of the second NOR gate 526 (NG2) is logic high. PG1 and PG2 are also logic high at time T4 because LS_ON being logic low causes the outputs of the first and second NAND gates 510, 514 to be logic high.

At time T5, VGS_LSD is discharged to VMILLER of the low-side FET 102 and thus the low-side FET 102 enters the Miller plateau region. At the same time, SW begins to increase from the voltage at the ground terminal.

At time T9, a voltage condition that indicates the beginning of the falling current transition occurs, which causes SW_HIGH to transition to logic high, which causes the output of the second NOR gate 526 to transition to logic low and turn off the fourth transistor 507. Although the falling current transition begins subsequently (e.g., at time T6 responsive to SW reaching VOUT_DC), in examples of this description, the beginning and end of the falling current transition are sensed based on circuit voltage conditions. As described above, SW_HIGH transitions to logic high responsive to SW being a second voltage, which is greater than VOUT_REF by a threshold voltage of the eleventh transistor 542 plus VDIODE. In some examples, SW being a first voltage refers to SW being less than the second voltage. This voltage condition is represented by the delta in voltage between SW and VOUT_REF at time T9. Accordingly, the gate drive strength for the low-side FET 102 is decreased at time T9 responsive to the voltage condition that indicates the beginning of the falling current transition occurring, which is reflected by the relative increase in IG_LSD (e.g., a decrease in the rate of gate discharge).

At time T6, SW reaches VOUT_DC, and IDS_LSD begins to decrease from IL as current through the inductor 112 begins to flow through the high-side FET 104. Time T6 marks the beginning of the falling current transition, which was detected based on a voltage condition at time T9, as described above.

At time T7, a voltage condition that indicates the end of the falling current transition occurs, which causes SW_HIGH to transition to logic low, which causes the output of the second NOR gate 526 to transition back to logic high and again turn on the fourth transistor 507. As described above, SW_HIGH transitions back to logic low responsive to the low-side FET 102 turning off (e.g., the output of comparator 546 being logic high), which is also the end of the falling current transition. Accordingly, the gate drive strength for the low-side FET 102 is increased at time T7 responsive to the voltage condition that indicates the end of the falling current transition occurring, which is reflected by the decrease in IG_LSD (e.g., increase in the rate of gate discharge).

As described above, the di/dt parameter of the low-side FET 102 is controlled during the falling current transition as well, which reduces ringing on the switching terminal 106. Also, after the falling current transition ends (e.g., at time T7), the gate drive strength for the low-side FET 102 is increased to further reduce switching losses of the DC-DC converter 100.

Figure 8:
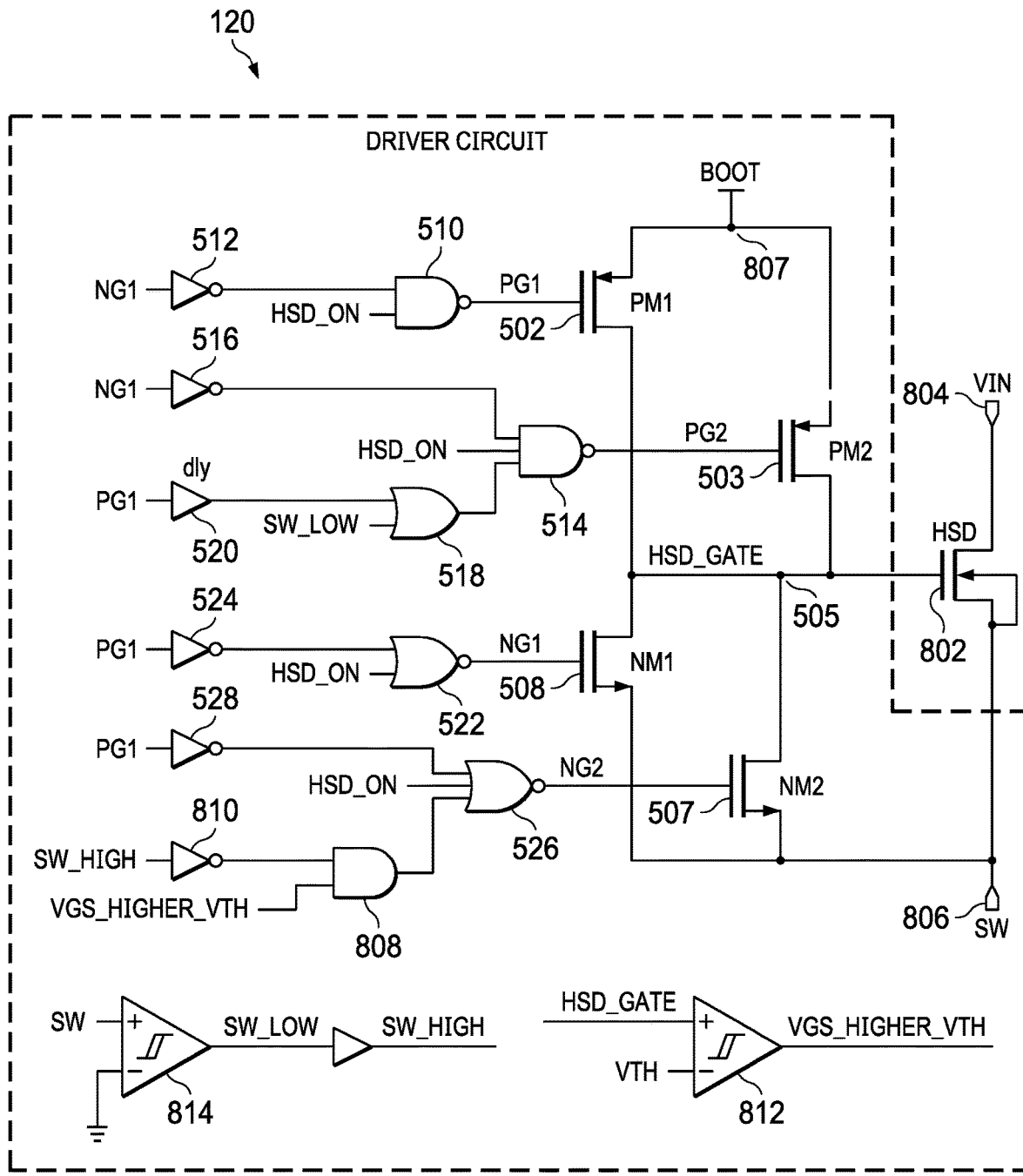
FIG. 8 is a schematic diagram of a driver circuit in various examples.

FIG. 8 is a schematic diagram of the gate driver 120 in other examples of this description. In the example of FIG. 8, the gate driver 120 is configured to control the high-side FET 802 of a buck converter. In this example, the high-side FET 802 of a buck converter is coupled to an input terminal 804 and to a switching terminal 806. As described above, in the case of a buck converter, it is useful to reduce ringing on the input terminal 804 and on the switching terminal 806 to reduce damage to components connected to these terminals 804, 806. As above regarding the low-side FET 102 in the boost converter example, in FIG. 8 the di/dt parameter for the high-side FET 802 is controlled during rising current and falling current transitions, which in turn reduces or limits the peak-to-peak voltage of the ringing and thus reduces the likelihood of damaging components that are connected to the buck converter.

The gate driver 120 is structurally similar to that described above with respect to FIG. 5, and like-numbered elements 502-528 are arranged as described above. In the example of FIG. 8, the drive terminal 505 is adapted to be coupled to the gate of the high-side FET 802 of a buck converter.

In the example of FIG. 8, the gate driver 120 is configured to control gates of the transistors 502, 503, 506, 507 to drive the gate of the high-side FET 802 by coupling the gate of the high-side FET 802 to either a boot supply terminal 807 (the voltage at which is labeled BOOT) or to the switching terminal 806 (the voltage at which is labeled SW). In an example, BOOT is a supply voltage (VCC) greater than SW. Similar to the example described above, the PWM control circuit 122 is coupled to the gate driver 120 and provides control signals to the gate driver 120 to switch on and off the high-side FET 802 and a low-side FET (not pictured). For example, the PWM control circuit 122 provides a PWM signal (HSD_ON) signal to the gate driver 120 (rather than the LSD_ON signal described above). In the examples of this description, the PWM control circuit 122 drives the HSD_ON signal to a logic high to cause the gate driver 120 to turn on the high-side FET 802 (e.g., to couple the gate of the high-side FET 802 to the BOOT terminal 807) and to a logic low to cause the gate driver 120 to turn off the high-side FET 802 (e.g., to couple the gate of the high-side FET 802 to the switching terminal 806).

The third input to the second NOR gate 526 differs slightly from that described in FIG. 5. In FIG. 8, the third input to the second NOR gate 526 is coupled to an output of an AND gate 808. SW_HIGH is provided as an input to inverter 810, and the output of the inverter 810 is provided as a first input to the AND gate 808. An output of a first comparator 812 (VGS_HIGHER_VTH) is provided as a second input to the AND gate 808. The output of the first comparator 812 is logic low responsive to the high-side FET 802 turning off (e.g., responsive to VGS of the high-side FET 802 being less than its threshold voltage (VTH)), which is also the end of the falling current transition.

The first transistor 502 and the third transistor 506 are effectively controlled by the HSD_ON signal. For example, responsive to HSD_ON being logic high (e.g., a first state), the third transistor 506 is off and the first transistor 502 is on, which drives the gate of the high-side FET 802 to BOOT.

Responsive to HSD_ON being logic low (e.g., a second state), the first transistor 502 is off and the third transistor 506 is on, which pulls the gate of the high-side FET 802 down to the switching terminal 806.

The second transistor 503 is used to control the di/dt parameter during the rising current transition of the high-side FET 802. The fourth transistor 507 is used to control the di/dt parameter during the falling current transition of the high-side FET 802. For example, the second transistor 503 is turned off during the rising current transition, and the fourth transistor 507 is turned off during the falling current transition, which reduces the drive strength provided to the gate of the high-side FET 802, and thus the rate of change of current through the high-side FET 802 and the amplitude of ringing at the input terminal 804 and the switching terminal 806. Further, responsive to HSD_ON being logic high (e.g., to turn on the high-side FET 802) and the high-side FET 802 being outside of the rising current transition, the second transistor 503 is turned on to increase the drive strength of the gate of the high-side FET 802 to reduce switching losses of the buck converter. Similarly, responsive to HSD_ON being logic low (e.g., to turn off the high-side FET 802) and the high-side FET 802 being outside of the falling current transition, the fourth transistor 507 is turned on to increase the drive strength of the gate of the high-side FET 802 to reduce switching losses of the buck converter.

As described above, the beginning of the rising current transition is indicated by the output of the delay buffer 520. Further, the end of the rising current transition is indicated by the SW_LOW signal. The beginning of the falling current transition is indicated by the SW_HIGH signal, while the end of the falling current transition is indicated by the VGS_HIGHER_VTH signal. In this example, a second comparator 814 has a non-inverting input coupled to the switching terminal 806 and an inverting input coupled to a ground terminal. An output of the second comparator 814 (which is used as both SW_LOW and SW_HIGH in FIG. 8) is logic high responsive to the voltage at the switching terminal 806 being greater than the voltage at the ground terminal.

The output of the delay buffer 520 is configured to delay its input (e.g., PG1) being provided as its output for approximately the amount of time that the high-side FET 802 gate-to-source voltage takes to reach the threshold voltage of the high-side FET 802, which is the beginning of the rising current transition. Accordingly, PG1 having transitioned to logic low responsive to HSD_ON being logic high causes the output of the OR gate 518 to transition to logic low approximately at the time at which the rising current transition begins, which turns off the second transistor 503. Accordingly, the gate drive strength for the high-side FET 802 is reduced responsive to the rising current transition beginning.

SW_LOW transitions to logic high responsive to the voltage at the switching terminal 806 being greater than the voltage at the ground terminal. This voltage condition indicates the end of the rising current transition. Responsive to SW_LOW transitioning to logic high, the output of the OR gate 518 transitions to logic high, which again turns on the second transistor 503. Accordingly, the gate drive strength for the high-side FET 802 is increased responsive to the rising current transition ending.

Thus, the di/dt parameter of the high-side FET 802 is controlled during the rising current transition, which reduces ringing on the input terminal 804 and/or the switching terminal 806 responsive to the high-side FET 802 turning on, as described above. Also, after the rising current transition ends, the gate drive strength for the high-side FET 802 is increased to reduce switching losses of the buck converter.

In this example, the beginning of the falling current transition is indicated responsive to the output of the AND gate 808 being logic high, which causes the fourth transistor 507 to turn off. The output of the AND gate 808 is logic high responsive to SW_HIGH being logic low (e.g., due to current through an inductor of the buck converter beginning to flow through the low-side FET of the buck converter behaving as a diode) and the high-side FET 802 being on (e.g., the output of the first comparator 812 being logic high because the high-side FET 802 gate voltage is greater than its threshold voltage).

The end of the falling current transition is indicated responsive to the output of the AND gate 808 being logic low due to the high-side FET 802 turning off (e.g., the output of the first comparator 812 being logic low because the high-side FET 802 gate voltage is less than its threshold voltage), which causes the fourth transistor 507 to again turn on.

As above, the di/dt parameter of the high-side FET 802 is controlled during the falling current transition as well, which reduces ringing on the input terminal 804. Also, responsive to the falling current transition ending, the gate drive strength for the high-side FET 802 is increased to further reduce switching losses of the buck converter.

In this description, the term "couple" may cover connections, communications, or signal paths that enable a functional relationship consistent with this description. For example, if device A provides a signal to control device B to perform an action, then: (a) in a first example, device A is coupled to device B; or (b) in a second example, device A is coupled to device B through intervening component C if intervening component C does not substantially alter the functional relationship between device A and device B, such that device B is controlled by device A via the control signal provided by device A. Also, in this description, a device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof. Furthermore, in this description, a circuit or device that includes certain components may instead be adapted to be coupled to those components to form the described circuitry or device. For example, a structure described as including one or more semiconductor elements (such as transistors), one or more passive elements (such as resistors, capacitors and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, such as by an end-user and/or a third party.

While certain components may be described herein as being of a particular process technology, these components may be exchanged for components of other process technologies. Circuits described herein are reconfigurable to include the replaced components to provide functionality at least partially similar to functionality available before the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in series or in parallel between the same two nodes as the single resistor or capacitor. Also, uses of the phrase "ground voltage potential" in this description include a chassis ground, an Earth ground, a floating ground, a virtual ground, a digital ground, a common ground, and/or any other form of ground connection applicable to, or suitable for, the teachings of this description. Unless otherwise stated, "about", "approximately", or "substantially" preceding a value means +/−10 percent of the stated value.

Modifications are possible in the described examples, and other examples are possible, within the scope of the claims.

What is claimed is:
1. A device, comprising:
a first field-effect transistor (FET) coupled between a first terminal and a drive terminal, the first FET configured to:
turn on responsive to a pulse-width modulation (PWM) signal having a first state; and
turn off responsive to the PWM signal having a second state;
a second FET coupled between the first terminal and the drive terminal, the second FET configured to:
turn on responsive to the PWM signal having the first state; and
turn off responsive to expiration of a particular delay after the second FET turns on;
a third FET coupled between the drive terminal and a second terminal, the third FET configured to:
turn on responsive to the PWM signal having the second state; and
turn off responsive to the PWM signal having the first state; and
a fourth FET coupled between the drive terminal and the second terminal, the fourth FET configured to:
turn on responsive to the PWM signal having the second state if a switching terminal has a first voltage; and
turn off responsive to the PWM signal having the first state or if the switching terminal has a second voltage.

2. The device of claim 1, wherein the second FET is configured to turn off during a rising current transition of a power FET coupled to the drive terminal, and to turn on outside of the rising current transition and responsive to the first FET being on.

3. The device of claim 1, wherein the fourth FET is configured to turn off during a falling current transition of a power FET coupled to the drive terminal, and to turn on outside of the falling current transition and responsive to the third FET being on.

4. The device of claim 1, wherein the second FET is configured to turn off responsive to expiration of the particular delay from the first FET turning on.

5. The device of claim 4, wherein the second FET is configured to turn on responsive to a switching terminal voltage being below an output voltage of a voltage converter coupled to the drive terminal.

6. The device of claim 1, wherein the fourth FET is configured to turn off responsive to a switching terminal voltage being greater than a reference voltage.

7. The device of claim 6, wherein the fourth FET is configured to turn on responsive to a gate voltage of a power FET coupled to the drive terminal being less than a threshold voltage of the power FET.

8. The device of claim 1, wherein the drive terminal is configured to couple to a gate of a low-side power FET, the first terminal is a voltage supply terminal, and the second terminal is a ground terminal.

9. The device of claim 1, wherein the drive terminal is configured to couple to a gate of a high-side power FET, the first terminal is a boot supply terminal, and the second terminal is a switching terminal.

10. The device of claim 1, wherein:
the first FET has a first FET gate, a first FET source, and a first FET drain, the first FET source coupled to the first terminal, and the first FET drain coupled to the drive terminal;
the second FET has a second FET gate, a second FET source, and a second FET drain, the second FET source coupled to the first terminal, and the second FET drain coupled to the drive terminal;
the third FET has a third FET gate, a third FET source, and a third FET drain, the third FET source coupled to the second terminal, and the third FET drain coupled to the drive terminal;
the fourth FET has a fourth FET gate, a fourth FET source, and a fourth FET drain, the fourth FET source coupled to the second terminal and the fourth FET drain coupled to the drive terminal;

the device further comprising:

a first inverter having a first inverter output and a first inverter input, the first inverter input coupled to the third FET gate;

a second inverter having a second inverter output and a second inverter input, the second inverter input coupled to the first FET gate;

a first NAND gate having a first NAND gate output and first NAND gate first and second inputs, the first NAND gate output coupled to the first FET gate, the first NAND gate first input coupled to the first inverter output, and the first NAND gate second input configured to receive the PWM signal;

a second NAND gate having a second NAND gate output and second NAND gate first, second, and third inputs, the second NAND gate output coupled to the second FET gate, the second NAND gate first input coupled to the first NAND gate first input, the second NAND gate second input coupled to the first NAND gate second input, and the second NAND gate third input configured to receive a rising current transition signal;

a first NOR gate having a first NOR gate output and first NOR gate first and second inputs, the first NOR gate output coupled to the third FET gate, the first NOR gate first input coupled to the second inverter output, and the first NOR gate second input coupled to the first NAND gate second input; and a second NOR gate having a second NOR gate output and second NOR gate first, second, and third inputs, the second NOR gate output coupled to the fourth FET gate, the second NOR gate first input coupled to the first NOR gate first input, the second NOR gate second input coupled to the first NAND gate second input, and the second NOR gate third input configured to receive a falling current transition signal.

11. The device of claim 10, including:
a delay buffer having a delay buffer input and a delay buffer output, the delay buffer input coupled to the first FET gate; and
an OR gate having an OR gate output and OR gate first and second inputs, the OR gate output coupled to the second NAND gate third input, the OR gate first input coupled to the delay buffer output, and the OR gate second input configured to receive a rising current transition end signal.

12. The device of claim 11, including:
a fifth FET having a fifth FET gate, a fifth FET source, and a fifth FET drain, the fifth FET gate coupled to a boot supply terminal, and the fifth FET drain adapted to be coupled to an output terminal of a voltage converter;
a sixth FET having a sixth FET gate, a sixth FET source, and a sixth FET drain, the sixth FET gate coupled to a switching terminal, and the sixth FET source coupled to the fifth FET source;
a seventh FET having a seventh FET gate, a seventh FET source, and a seventh FET drain, the seventh FET gate coupled to the first terminal, and the seventh FET drain coupled to the sixth FET drain; and
an eighth FET having an eighth FET gate, an eighth FET source, and an eighth FET drain, the eighth FET gate coupled to the first FET gate, the eighth FET source coupled to the second terminal, and the eighth FET drain coupled to the seventh FET source;

wherein the seventh FET source and the eighth FET drain are configured to provide the rising current transition end signal.

13. The device of claim 12, wherein the OR gate is a first OR gate, the device including:
a comparator having a comparator output, a comparator non-inverting input, and a comparator inverting input, the comparator non-inverting input configured to receive a threshold voltage, and the comparator inverting input coupled to the drive terminal;
a second OR gate having a second OR gate output and second OR gate first and second inputs, the second OR gate first input coupled to the comparator output, and the second OR gate second input coupled to the first NAND gate first input;
a ninth FET having a ninth FET gate, a ninth FET source, and a ninth FET drain, the ninth FET gate coupled to the second OR gate output, the ninth FET source coupled to the second terminal;
a tenth FET having a tenth FET gate, a tenth FET source, and a tenth FET drain, the tenth FET gate coupled to a third inverter output, the third inverter having an input coupled to the comparator output, and the tenth FET source coupled to the ninth FET drain;
an eleventh FET having an eleventh FET gate, an eleventh FET source, and an eleventh FET drain, the eleventh FET gate configured to receive a reference voltage, and the eleventh FET drain coupled to the tenth FET drain; and
a diode coupled to the switching terminal and to the eleventh FET source;
wherein the ninth FET drain and the tenth FET source are configured to provide the falling current transition signal.

14. The device of claim 10, wherein the drive terminal is adapted to be coupled to a low-side FET gate, the first terminal is a voltage supply terminal, and the second terminal is a ground terminal.

15. The device of claim 10, wherein the drive terminal is adapted to be coupled to a high-side FET gate, the first terminal is a boot supply terminal, and the second terminal is a switching terminal.

16. A system, comprising:
a voltage converter including a power field-effect transistor (FET); and
a gate driver coupled to the voltage converter, the gate driver including:
a first FET coupled between a drive terminal of the power FET and a first terminal, the first FET configured to:
turn on responsive to a pulse-width modulation (PWM) signal having a first state; and
turn off responsive to the PWM signal having a second state;
a second FET coupled between the drive terminal and the first terminal, the second FET configured to:
turn on responsive to the PWM signal having the first state; and
turn off responsive to expiration of a particular delay after the second FET turns on;
a third FET coupled between the drive terminal and a second terminal, the third FET configured to:
turn on responsive to the PWM signal having the second state; and
turn off responsive to the PWM signal having the first state; and a fourth FET coupled between the drive terminal and the second terminal, the fourth FET configured to:
turn on responsive to the PWM signal having the second state if a switching terminal has a first voltage; and
turn off responsive to the PWM signal having the first state or if the switching terminal has a second voltage.

17. The system of claim 16, wherein the second FET is configured to turn off during a rising current transition of the power FET, and to turn on outside of the rising current transition and responsive to the first FET being on.

18. The system of claim 16, wherein the fourth FET is configured to turn off during a falling current transition of the power FET, and to turn on outside of the falling current transition and responsive to the third FET being on.

19. The system of claim 16, wherein the second FET is configured to turn off responsive to expiration of the particular delay from the first FET turning on, and wherein the second FET is configured to turn on responsive to a switching terminal voltage of the voltage converter being below an output voltage of the voltage converter.

20. The system of claim 16, wherein the fourth FET is configured to turn off responsive to a switching terminal voltage of the voltage converter being greater than a reference voltage, and wherein the fourth FET is configured to turn on responsive to a gate voltage of the power FET being less than a threshold voltage of the power FET.

* * * * *